United States Patent [19]

Amer et al.

[11] Patent Number: 4,759,956

[45] Date of Patent: Jul. 26, 1988

[54] PROCESS FOR ENCAPSULATING PARTICLES USING POLYMER LATEX

[75] Inventors: Gamal I. Amer, New Providence; Jeffrey N. Foster, Little Ferry; Carmine P. Iovine, Bridgewater, all of N.J.

[73] Assignee: Lever Brothers Company, New York, N.Y.

[21] Appl. No.: 54,174

[22] Filed: May 22, 1987

[51] Int. Cl.$^4$ ............................................. B05D 1/22
[52] U.S. Cl. ............................... 427/213; 252/174.13; 427/221
[58] Field of Search .................................. 427/213, 221

[56] References Cited

U.S. PATENT DOCUMENTS

| | | | |
|---|---|---|---|
| 3,112,274 | 11/1963 | Morgenthaler et al. | 252/94 |
| 3,253,944 | 5/1966 | Wurster . | |
| 3,462,293 | 8/1969 | Voris | 427/213 |
| 3,576,760 | 4/1971 | Gould et al. | 252/403 |
| 3,650,961 | 3/1972 | Hudson | 252/94 |
| 3,666,680 | 5/1972 | Briggs | 252/316 |
| 3,691,090 | 9/1972 | Kitajima et al. | 252/316 |
| 3,908,045 | 9/1975 | Alterman et al. | 427/213 |
| 3,944,497 | 3/1976 | Alterman et al. | 252/96 |
| 3,975,280 | 8/1976 | Hachmann et al. | 252/102 |
| 3,983,254 | 9/1976 | Alterman et al. | 428/203 |
| 3,992,317 | 11/1976 | Brichard et al. | 252/186 |
| 3,992,558 | 11/1976 | Smith-Johannsen | 427/213 |
| 4,124,734 | 11/1978 | Alterman et al. | 428/203 |
| 4,126,717 | 11/1978 | Mazzola | 427/220 |
| 4,136,052 | 1/1979 | Mazzola | 252/94 |
| 4,421,669 | 12/1983 | Brichard | 427/213 X |
| 4,657,784 | 4/1987 | Olson | 427/213 |
| 4,671,972 | 6/1987 | Schobel | 427/213 |

FOREIGN PATENT DOCUMENTS 911410 11/1962 United Kingdom .

*Primary Examiner*—Shrive P. Beck
*Attorney, Agent, or Firm*—Milton L. Honig; James J. Farrell

[57] ABSTRACT

A process is disclosed for coating particles comprising suspending the particles in a fluidized bed and introducing therein an encapsulating latex. During introduction of the latex, the fluid bed must be maintained at a temperature which is within 10° C. lower to 20° C. higher than the glass transition temperature of the polymer. Typical core materials include halogen and peroxygen bleaches, bleach precursors, enzymes, colorants and fabric softeners. Preferably, the latex comprises water as a carrier and a polymer with carboxyl functionality, the polymer being insoluble in water.

30 Claims, No Drawings

PROCESS FOR ENCAPSULATING PARTICLES USING POLYMER LATEX

BACKGROUND OF THE INVENTION

1. Field of the Invention

The invention concerns a process for encapsulating active particles within a polymer shell.

2. The Prior Art

There are many particulate active materials which require protection from atmospheric moisture and air or from co-ingredients of compositions with which they are formulated. Examples of such actives include catalysts, bleaches, colorants, enzymes, and similar particles. Some of these actives must not only be protected from the environment but the environment must be protected from the actives. For instance, chlorine releasing bleach particles must be shielded from atmospheric moisture during storage to prevent early decomposition. Conversely, dyes and perfumes formulated with the bleach in a detergent powder must be protected from oxidation by the bleach. Therefore, it may readily be appreciated that coatings encapsulating active particles are important and that the encapsulation be sufficiently coherent to function effectively as a barrier.

Encapsulated solid actives, as suggested above, find use in diverse fields. Although the invention is not so limited, the present process finds special utility in manufacturing encapsulated bleaching related particles for detergent compositions.

There have been a number of encapsulated chlorine bleaches described in the detergent art. U.S. Pat. Nos. 3,908,045, 3,944,497, 3,983,254 and 4,124,734 all to Alterman et al. report the coating of chlorine-releasing particles in a process wherein a non-aqueous solution of a solidifiable fatty acid is sprayed onto a fluidized bed containing the chlorine-releasing particles. U.S. Pat. Nos. 4,078,099, 4,126,717 and 4,136,052 to Mazzola describe a solventless method for coating chlorinating agents. In that process, a rotating drum mixer agitates chlorine-releasing particles while a melted solventless fatty acid is sprayed thereonto. Subsequently, a second coating is applied by spraying a melted solventless mixture of fatty acid, microcrystalline wax and polyoxyethylene-polyoxypropylene copolymer. The patent notes that it is important to maintain an ambient air temperature in the mixer within the softening range of the coating agents to allow the coatings to spread around each particle; more coherent coatings were said to be thereby obtainable.

U.S. Pat. No. 3,112,274 (Morgenthaler et al.) describes a process for making a bleach composition wherein dry polychlorocyanurate particles are suspended in a fluidized bed into which is sprayed an aqueous slurry of an inorganic coating salt. The process emphasizes low drying temperatures ranging from 100° F. to 170° F. outside of which range effective coating is hindered. Another patent, U.S. Pat. No. 3,650,961 (Hudson) practices an addition the reverse of that disclosed in the aforesaid patents. Inorganic coating salts are introduced first into the fluidized bed. Subsequently, an aqueous slurry of chlorocyanurate is sprayed into the bed. Microscopic examination of the resultant particles was said to show the chlorocyanurate to be disposed predominantly at the center while the inorganic salt surrounded the core. British Pat. No. 911,410 (Procter) encapsulates trichloroisocyanuric acid by agitating this material in a revolving drum whereupon is sprayed a solution of lauric acid slurried in carbon tetrachloride.

Fluidized bed coating technology, as evidenced by the aforecited art, requires that the encapsulating wall material be either in a melt or solubilized in some solvent to facilitate delivery into the bed. With regard to the solvent approach, wall materials which are water insoluble require a non-aqueous solvent for delivery. Non-aqueous solvent processes are, however, complicated. They often require handling of flammable solvents, recovery systems, and generally present environmental problems. When very reactive materials are present in the particles to be coated, the handling of solvents becomes especially difficult. Thus, it is desirable in most instances to use water as the carrier to avoid the aforestated complications.

A further problem with certain non-aqueous and aqueous solvent systems is their limited efficiency in delivering high concentrations of encapsulating material. It is desirable to deliver concentrations of 30–50% or more in spray form onto agitated solid actives in a fluid bed. Encapsulating material solubilized at high concentrations in non-aqueous and aqueous mediums frequently results in solutions of extremely high viscosity. Efficient spraying of such high viscosity solutions is very difficult.

Therefore, it is an object of the present invention to provide a process which affords the formation of high-quality, continuous coatings around active particulate materials.

It is another object of the present invention to provide a process wherein the coatings may be applied from an aqueous vehicle which benefits from the non-hazardous nature, handling simplicity and environmental safety associated with water.

A further object of this invention is to provide a high efficiency process characterized by the delivery of encapsulating material in highly concentrated form.

SUMMARY OF THE INVENTION

A process for coating particles is provided comprising:

(i) suspending said particles in a fluidized bed;
(ii) introducing a latex into said particle containing bed, said latex comprising a polymer and a liquid carrier wherein said polymer is insolubly dispersed, the ratio of carrier to polymer being about 1000:1 to 1:1.6; and
(iii) maintaining said fluid bed during introduction of said latex at a temperature which is within 10° C. lower to 20° C. higher than the glass transition temperature of said polymer.

DETAILED DESCRIPTION OF THE INVENTION

It has been discovered that solid active particles can be encapsulated with polymers to obtain coherent, continuous films surrounding the particles. Achievement of continuous, coherent films results from use of polymers, especially alkali soluble polymers, in a latex form. Formation of a latex in which polymer is suspended in water as extremely fine particles is an alternative to dissolving barrier material in a solvent. Many types of polymers can be fashioned into latexes.

Formation of a continuous film from a latex or any kind of dispersion is, however, not a simple matter. For example, in fluidized bed coating wherein a polymer latex is sprayed onto a core particle and water evaporated therefrom, it has now been found that uniform, coherent films will not be formed unless the small polymer particles can flow together and coalesce. Simply evaporating water but leaving polymer behind generally does not result in coherent good barrier films.

By practice of this invention under appropriate conditions, one may spray a latex of water-insoluble polymer onto solid active particles and form coherent, continuous barrier films around the solid active core. The key to this invention is performing the coating at a temperature which is within 10° C. lower to 20° C. higher than the glass transition temperature of the polymer. Preferably, the aforesaid temperature should be within 5° C. lower to 15° C. higher, most preferably 2° C. lower to 5° C. higher than the glass transition temperature of the polymer.

Good mechanical strength is required where, as in many instances, further processing subjects the encapsulates to stress. It has been noted that capsules produced using polymers with high glass transition temperatures (Tg), those greater than 80° C., have less mechanical strength than those produced from materials having a Tg ranging from 30° to 80° C. Indeed, the preferred Tg is between 30° and 50° C. Use of polymers with lower Tg results in bed agglomeration during processing. Polymers of too high a Tg do not, on the other hand, allow formation of an integral coating over the particles at practical processing temperatures. Capsules prepared from high Tg polymers at practical processing temperatures have a faster release rate of active which indicates that the coating quality is significantly lower. If the process temperature is raised to accommodate very high Tg properties, the polymers do not coat at all but merely undergo spray-drying and are not deposited on the core material.

Latexes of the present invention may be applied to the solid active granules in a number of different modes. Most effective, however, is a mode known as the Wurster spray method. Yields and efficiency in excess of 90% may be achieved by this route.

U.S. Pat. No. 3,253,944, herein incorporated by reference, describes details of the Wurster procedure. According to Wurster, fluidized beds in general are characterized by randomness of particle motion. Random motion is undesirable when coating particles because of resultant slow coating rates. To overcome this problem, a cyclic flow pattern is established by controlled velocity differences. The technique involves use of a vertically disposed coating tower wherein particles are suspended in an upwardly flowing air stream entering the bottom of the tower imparting controlled cyclic movement to the particles with a portion of the suspended bed flowing upwardly and the other portion downwardly without randomness of particle motion. All of the coating material is directed into the high velocity air stream which provides coating of only the particles moving upwardly under high velocity.

An alternate mode for applying latexes of the present invention to the solid granules is by the Top Spray Coating technique. Examples of equipment configured for top spraying into the granule containing bed include the "Aeromatic" and "FLO-coater" (Freund) apparatus; the latter is unusual in that the spray guns are mounted in the column side walls and angled downward. Top spraying in contrast to the Wurster type has been found to be less efficient and results in lower yields, in the context of this invention.

When applying the coatings of this invention, it is convenient to operate under normal pressure regimes, i.e. atmospheric pressure, and to operate at a temperature below the boiling point of water. Evaporation of water is to be maximized for good throughput efficiency. The principle, however, of coating at a few degrees within the glass transition temperature of the polymer may be applied to any temperature in which the water carrier could be evaporated. A balance between throughput efficiency and coating quality may readily be determined for specific systems. Under such conditions, however, there would not result highly efficient coatings. Consequently, the preferred range for applying the latexes is at temperatures of about 30° to 80° C. using polymers with glass transition temperatures somewhere between 20° and 70° C.

The term polymer with respect to the glass transition temperature is intended also to include coalescing agents such as plasticizers which may be added to the polymer itself to lower the glass transition temperature. Thus, the glass transition temperature within the meaning of this invention is one measured on a compounded polymer including all coalescing additives therein. Thermo methods such as Differential Scanning Calorimetry can be utilized to measure the glass transition temperature.

The polymer solids content of the latex may range from about 0.1 up to 60%, preferably 20 to 60%, optimally between 40 and 50%. The ratio of carrier (e.g. water) to polymer may range from 10:1 to 1:1.6, preferably 2:1 to 1:1.

Average diameters of the dispersed polymer may range from about 0.01 micron to about 100 micron. Preferably, the size will range from about 0.05 micron to about 5 micron, optimally from about 0.05 micron to about 0.5 micron.

A wide variety of homopolymers and copolymers are suitable for coatings. Fatty acids, soaps and waxes are, however, not considered within the operative scope of the present invention.

Illustrative of suitable homopolymers of this invention are those of polyacrylic acid and polymethacrylic acid. Under circumstances where the foregoing homopolymers are water soluble, the liquid carrier will suitably be an oil forming the continuous phase (e.g. hydrocarbon) of the latex emulsion. With water as the carrier, appropriate homopolymers include polyvinylacetate and polyvinylchloride.

Illustrative copolymers of this invention are those formed from styrene, acrylic acid, methacrylic acid, vinyl acetate, crotonic acid, vinyl neodecanoate and butenoic acid. Exemplative of carboxylate type copolymers are the styrene/alkyl acrylate and partially esterified polyacrylic and polymethacrylic salts and free acid forms. Among the foregoing materials are poly(butyl methacrylate), poly(methyl acrylate), poly(methyl methacrylate), poly(acrylic acid/$C_1$–$C_{20}$ alkyl methacrylate), poly(methacrylic acid/$C_1$–$C_{20}$ alkyl acrylate), poly(acrylic acid/$C_1$–$C_{20}$ alkyl acrylate) and poly(methacrylic acid/$C_1$–$C_{20}$ alkyl methacrylate). These copolymers may be prepared by polymerization of the respective monomers by traditional oil-in-water or water-in-oil emulsion polymerization techniques. Alternatively, a pseudo latex may be prepared by esterification of preformed polymer with $C_1$–$C_{20}$ alkanol.

It is to be understood that the terms homopolymer and copolymer are each a sub-category of "polymer". Moreover, the term copolymer includes polymers fashioned from 2 to 6 different monomers in block or random linkage. For example, a very useful material would be poly(methacrylic acid/ethyl acrylate/butyl acrylate/methyl methacrylate) having the respective monomer units present in weight ratio 25:25:30:20.

In the embodiment of this invention where the solid active particles are oxidizing materials, especially chlorine releasing agents, it is desirable that the encapsulating polymers have certain dissolution properties. Thus, the most useful polymers are materials that dissolve in alkali. The best performing materials are polycarboxylate polymers being water insoluble at pH 7 but which are solubilized in alkaline media at pH 10 or higher. The alkali dissolution characteristic provides an alkali scavenging buffer zone between a normally acidic chlorine active oxidant and co-formulated components such as alkaline detergents or builders.

Preparation of Capsules

Solid actives are charged into a fluidized bed. The bed equipment is obtainable from the Aeromatic or Glatt Equipment Corporations. A polymer latex, preferably at 50% solids or diluted with distilled water, is screened to remove undesirable impurities. A water soluble dye may be added to aid in visual monitoring of the coating process. Air flow rate is increased to the "point of fluidization" and the atomizing air pressure is increased to 2-2.5 Bar. When the bed temperature has risen significantly, the air flow is increased to provide significant fluidization, between the "point of fluidization" and "point of entrainment", typically 20-145 cfm. The latex metering pump is then activated to feed this material into the bed. As time progresses, process parameters including fan setting, latex flow rate, inlet/outlet air temperature, and filter resistance are monitored. Air flow is continuously adjusted during the processing to maintain fluidization. When coating is complete, the outlet air temperature is allowed to rise until the difference between inlet and outlet temperatures is less than 5° C., indicating complete or near complete drying. The product is then retrieved from the coating apparatus.

Solid Actives

As earlier noted, solid actives amenable to the process can include a wide range of particulate materials such as catalysts, enzymes, bleaches, colorants, and similar components. These materials will be present in amounts from about 1% to 99% by weight of the final encapsulate. Preferably, the amount of these core materials will range from about 20% to about 95%, more preferably from 50% to 90%.

When the solid active core particle is an oxidizing material, it may be a chlorine or bromine releasing agent or a peroxygen compound or precursor. Among suitable reactive chlorine or bromine oxidizing materials are heterocyclic N-bromo and N-chloro imides such as trichlorocyanuric, tribromocyanuric, dibromocyanuric and dichlorocyanuric acids, and salts thereof with water-solubilizing cations such as potassium and sodium.

Dry, particulate, water-soluble anhydrous inorganic salts are likewise suitable for use herein such as lithium, sodium or calcium hypochlorite and hypobromite. Chlorinated trisodium phosphate is another core material. Sodium dichloroisocyanurate is, however, usually the preferred bleaching agent and may be available from the Olin Corporation under the trademark Clearon CDB-56.

Anywhere from about 50 to about 99.5% by weight of the total uncoated particles may be active halogen or peroxygen releasing oxidizing material. Preferably oxidizing material is present from about 80 to about 95%, more preferably from about 85 to about 95%. The oxidizing material should contain from 10 to 60% releasable active chlorine or hydrogen peroxide equivalent. For instance, Clearon CDB-56, a chlorinated sodium isocyanurate may be suitable as the particle and releases about 56% chlorine.

Organic peroxy acids are effective bleaches and may be suitable as the solid active uncoated core particle. The peroxy acids usable in the present invention are solid and, preferably, substantially water-insoluble compounds. By "substantially water-insoluble" is meant herein a water-solubility of less than about 1% by weight at ambient temperature. In general, peroxy acids containing at least about 7 carbon atoms are sufficiently insoluble in water for use herein.

Typical monoperoxy acids useful herein include alkyl peroxy acids, alkenyl peroxy acids and aryl peroxy acids such as:
(i) peroxybenzoic acid and ring-substituted peroxybenzoic acids, e.g. peroxy-$\alpha$-naphthoic acid
(ii) aliphatic and substituted aliphatic monoperoxy acids, e.g. peroxylauric acid and peroxystearic acid.

Typical diperoxy acids useful herein include alkyl diperoxy acids, alkenyl diperoxy acids and aryldiperoxy acids, such as:
(iii) 1,12-diperoxydodecanedioic acid.
(iv) 1,9-diperoxyazelaic acid.
(v) diperoxybrassylic acid; diperoxysebacic acid and diperoxyisophthalic acid.
(vi) 2-decyldiperoxybutane-1,4-dioic acid.

Inorganic peroxygen generating compounds may also be suitable as particles for coating in the present invention. Examples of these materials are salts of monopersulfate, perborate monohydrate and tetrahydrate, and percarbonate.

Solid bleach precursors or activators may also be usefully coated by the process of the present invention. Illustrative of organic precursors are N,N,N',N'-tetraacetyl-ethylene diamine (TAED) and sodium nonanoyloxy benzene sulfonate. Inorganic bleach catalysts such as manganese salts or manganese ions adsorbed onto aluminosilicate supporting substrates such as zeolites could also benefit from this invention. The manganese catalysts may be prepared according to the method primarily described in U.S. Pat. No. 4,536,183 (Namnath). Other catalysts of this type are more fully described in U.S. Pat. Nos. 4,601,845 (Namnath), 4,626,373 (Finch et al.) and co-pending U.S. application Ser. No. 837,613 (Rerek), all of which are herewith included by reference.

An especially preferred catalyst for promoting peroxygen bleaching is the complex of manganese (III) and a multidentate ligand supplied by a complexing agent, preferably a hydroxycarboxylic acid containing at least 5 carbon atoms and the salts, lactones, acid esters, ethers and boric esters thereof. Illustrative of such complexes is manganese (III) gluconate.

Enzymes and surfactants may be used as the solid active core. These enzymes and surfactants may be deposited or entrapped upon a supporting substrate such as an inorganic salt, aluminosilicate, organic polymer or other non-interactive base material. Suitable enzymes include those classed under lipase, protease, cellulase and amylase. Particularly preferred is the protease known as savinase. Suitable surfactants include the nonionic, anionic, cationic, zwitterionic, amphoteric and detergent active mixtures thereof. Particularly preferred are the ethoxylated fatty alcohols.

The aforementioned polymer coated particles should have an average particle size ranging between 150 and 3000 microns, preferably ranging between 500 and 2000 microns, optimally between 750 and 1500 microns.

The following examples will more fully illustrate the embodiments of the invention. All parts, percentages and proportions referred to herein and in the appended claims are by weight unless otherwise indicated.

EXAMPLES 1-5

A series of five experiments were conducted to demonstrate the effect of glass transition temperature of a polymer in latex form on the quality of the resultant encapsulation. A chlorine-releasing oxidizing material, Clearon CDB-56, in an amount from 600 to 800 grams was charged into a fluidized bed (Aeromatic or Glatt apparatus). A copolymer based on poly(methacrylic acid) was utilized. A latex of this copolymer initially at approximately 50% solids was diluted with distilled water to the appropriate solids content as listed in Table I. The latex was then screened (125 micron) to remove undesirable impurities. Air flow rates were increased to the "point of fluidization" and the atomizing air pressure increased to 2-2.5 Bar. When the bed temperature had risen significantly, the air flow was increased to provide fluidization between the "point of fluidization" and the "point of entrainment", typically 20-145 cfm. Thereafter, the latex was pumped into the fluid bed at a controlled rate. Latex flow rate, inlet/outlet air temperature and other process parameters were monitored and are recorded in Table I. During each experiment, the air flow was adjusted to keep the bed under significant fluidization. When the coating process was complete, the outlet air temperature was allowed to rise until the difference between inlet and outlet temperature was less than 5° C. The resultant product was then retrieved from the coater.

Experiment 1 utilized a poly(methacrylic acid) based latex of 67° C. Tg in a fluidized bed held at 45° C. Coating efficiency was only 35% and the yield 86.9%. Experiment 2 was a significant improvement over the first experiment. Here a poly(methacrylic acid) based latex was utilized with a 35° C. Tg introduced to a fluidized bed held at 45° C. Coating efficiency improved to 68.5% and yield was 93.7%. In experiment 3, the poly(methacrylic acid) based latex had a Tg of greater than 100° C. and the fluidized bed was kept at 45° C. Coating efficiency and yield were somewhat less than in experiment 2. Best results were obtained with experiment 4 wherein a copolymer based on poly(methacrylic acid) of 35° C. Tg was used for coating in a fluidized bed held at 40° C. Latex was sprayed into the coater apparatus in the manner described by Wurster. Coating efficiency and yield increased substantially to 90.3% and 98%, respectively.

Experiment 5 utilized poly(methacrylic acid) based latex with a Tg of 67° C. and fluid bed temperature of 43° C. As in experiment 1, both coating efficiency and yield, 42% and 88.3%, respectively, were significantly below those of experiments 2 and 4.

SEM photomicrographs were taken of all the resultant encapsulates. The photomicrograph of experiment 3 showed capsules having cracked, blotchy surfaces. Capsules made in experiment 2 had uncracked surfaces and exhibited fewer blotchy areas. The SEM photomicrograph of experiment 4 indicated even fewer imperfections.

TABLE I

Process Conditions and Results

| | Experiment No. | | | | |
|---|---|---|---|---|---|
| | 1 | 2 | 3 | 4 | 5 |
| A. Reaction Conditions/Parameters | | | | | |
| Polymer type | methacrylic acid based latex | | | | |
| Tg (°C.) | 67.00 | 35.00 | >100 | 35.00 | 67.00 |
| % Solids | 30.00 | 30.00 | 30.00 | 45.60 | 30.00 |
| Coater | Aero | Glatt | Glatt | Glatt | Aero |
| Spray Type | Top | Top | Top | Wurster | Top |
| Charge (grams) | 600.00 | 800.00 | 600.00 | 800.00 | 600.00 |
| Flow rate (ml/min) | 11.50 | 12.50 | 13.00 | 9.5 | 11.80 |
| Processing Temp. (°C.) | 45.00 | 45.00 | 45.00 | 42.00 | 43.00 |
| Batch time (min) | 50.00 | 47.00 | 37.00 | 45.00 | 68.00 |
| B. Properties and Performance | | | | | |
| Loading (% CDB in product) | 89.30 | 85.80 | 87.50 | 84.1 | 90.00 |
| % Coating | 10.70 | 14.20 | 12.50 | 15.9 | 10.00 |
| Coating Effic. (%) | 35.00 | 68.50 | 59.80 | 90.30 | 42.00 |
| % Yield | 86.90 | 93.70 | 92.70 | 98.00 | 88.30 |

EXAMPLES 6-7

The following experiments were performed to illustrate the broad applicability of the new process to coating particles other than chlorine releasing bleach. Examples 6 and 7 investigated the coating of granulated manganese gluconate (catalyst for peroxygen bleaching) and granulated diperoxydodecanedioic acid (peroxygen bleach) as core particles for encapsulation by the latex bearing polymer in the Wurster configuration. An acrylic copolymer latex, Rohm & Haas WS-24, was employed as the coating material. This commercial copolymer was measured by our laboratories to have a Tg of approximately 25° C. Table II outlines the process conditions for encapsulating the core materials. Overall processing was carried out similar to that described for Examples 1-5, except for the specific conditions specified in the Table.

TABLE II

Process Conditions

| | Example 6 | Example 7 |
|---|---|---|
| Core material | Agglomerated Mn Gluconate | Agglomerated DPDA |
| Polymer | R&H WS-24 (Acrylic Copolymer) | R&H WS-24 (Acrylic Copolymer) |
| % Solids | 36 | 36 |
| Inlet Temp (C.) | 56 | 55 |
| Outlet Temp. (C.) | 34 | 36 |
| Bed Temp. (C.) | 36 | 38 |
| Loading (%) | 85 to 90 | 85 to 90 |
| Particle Size | 1200 microns | 800 microns |
| % Yield | 94 | 89 |

A summary of the latex Tg, process temperature and capsule quality is outlined in Table III. From this Table, it is seen that both manganese gluconate and DPDA granules can be successfully encapsulated under appropriate conditions. It is to be noted that excellent quality coated DPDA capsules are produced when the latex polymer Tg is 13° C. less than the processing temperature. When both Tg and process temperature are identical, i.e. 42° C., the capsule quality is only good, although still acceptable.

TABLE III

Capsule Quality and Process Parameters

| Core Material | Latex Tg (°C.) | Process Temp. (°C.) | Capsule Quality |
|---|---|---|---|
| Mn Gluconate | 25 | 36 | Excellent |
| DPDA Granules | 25 | 38 | Excellent |
| DPDA Granules | 42 | 42 | Good |

Poor - Cracks Extending to Core, Poor Adhesion to Core
Fair - Surface Cracks, Good Adhesion to Core, Holes within Coating
Good - Some Holes within Coating, Good Adhesion to Core
Excellent - Few Imperfections

EXAMPLE 8

An additional set of experiments were performed to further evaluate the relationship of process parameters to capsule quality using CDB-56 as the core material in a Wurster configuration. General process conditions were similar to that fully described in Examples 1–5. Specific latex Tg and process temperatures are outlined in Table IV.

TABLE IV

Capsule Quality and Process Parameters

| Core Material | Latex Tg (°C.) | Process Temp. (°C.) | Capsule Quality |
|---|---|---|---|
| CDB-56 | 35 | 38 | Excellent |
| CDB-56 | 60 | 40 | Poor |
| CDB-56 | 53 | 41 | Fair |

Poor - Cracks Extending to Core, Poor Adhesion to Core
Fair - Surface Cracks, Good Adhesion to Core, Holes within Coating
Good - Some Holes within Coating, Good Adhesion to Core
Excellent - Few Imperfections Excellent capsule quality was obtained utilizing a polymer Tg of 35° C. in a process run at 38° C. When a polymer of Tg 53° C. was employed with a process temperature 12° lower, a capsule of only fair quality was obtained. The experiment wherein the polymer Tg was 20° C. higher than the process provided a capsule quality that was quite poor. From these results, it is evident that the Tg should be no higher than 20° C. above the process temperature and, preferably, less than the process temperature.

The foregoing description and examples illustrate selected embodiments of the present invention. In light thereof, various modifications will be suggested to one skilled in the art, all of which are within the spirit and purview of this invention.

What is claimed is:

1. A method for forming a coherent, continuous coating around particles used in detergent compositions comprising:
   (i) suspending said particles in a fluidized bed;
   (ii) selecting a polymer to provide said coating having a glass transition temperature within 20° C. lower to 10° C. higher than an operating temperature of said fluidized bed, said polymer being alkali soluble but below pH 7 being water insoluble;
   (iii) introducing a latex into said particle containing bed, said latex comprising said polymer and a liquid carrier consisting of water wherein said polymer is insolubly dispersed, the polymer solids content of the latex ranging from greater than 30% to 60%; and
   (iv) maintaining said fluid bed during introduction of said latex at said operating temperature.

2. A method according to claim 1 wherein said polymer has a glass transition temperature of 80° C. or less.

3. A method according to claim 2 wherein said polymer has a glass transition temperature higher than 30° C.

4. A method according to claim 1 wherein said polymer has a glass transition temperature between 30° and 50° C.

5. A method according to claim 1 wherein the temperature of said fluidized bed is kept between 30° and 80° C.

6. A method according to claim 5 wherein the temperature of said fluidized bed is kept between 20° and 70° C.

7. A method according to claim 1 wherein said glass transition temperature is within 15° C. lower to 5° C. higher than an operating temperature of said fluidized bed.

8. A method according to claim 1 wherein said glass transition temperature is within 5° C. lower to 2° C. higher than an operating temperature of said fluidized bed.

9. A method according to claim 1 wherein the ratio of carrier to polymer is from 2:1 to 1:1.

10. A method according to claim 1 wherein said particle is selected from the group consisting of bleach, enzyme, surfactant, colorant, fabric softener and bleach precursors.

11. A method according to claim 10 wherein said bleach is a chlorine or bromine releasing agent.

12. A method according to claim 10 wherein said bleach is an alkali metal salt of chlorinated isocyanuric acid.

13. A method according to claim 10 wherein said bleach is an organic peroxy acid.

14. A method according to claim 13 wherein said organic peroxy acid is selected from the group consisting of peroxybenzoic acid and ring-substituted peroxybenzoic acids, aliphatic and substituted aliphatic monoperoxy acids, 1,12-diperoxydodecanedioic acid, 1,9-diperoxyazelaic acid, diperoxybrassylic acid, diperoxysebacic acid, diperoxyisophthalic acid and 2-decyldiperoxybutane-1,4-dioic acid.

15. A method according to claim 14 wherein said organic peroxy acid is 1,12-diperoxydodecanedioic acid.

16. A method according to claim 10 wherein said bleach is an inorganic peroxygen generating compound selected from the salts of monopersulfate, perborate monohydrate and tetrahydrate and percarbonate.

17. A method according to claim 10 wherein said enzyme is selected from the group consisting of amylase, lipase, protease, cellulase and mixtures thereof.

18. A method according to claim 10 wherein said precursor is selected from the group consisting of manganese salts, manganese supported on aluminosilicate, N,N,N',N'-tetraacetyl-ethylene diamine and sodium nonanoyloxy benzene sulfonate.

19. A method according to claim 10 wherein said precursor is manganese (III) complexed with a multidentate ligand selected from hydroxycarboxylic acids having 5 carbon atoms and the salts, lactones, acid esters, ethers and boric esters thereof.

20. A method according to claim 1 wherein said particles are present in an amount from 50% to 99.5% by weight of final encapsulated material.

21. A method according to claim 1 wherein said latex is sprayed into said fluid bed by the Wurster method comprising suspending said particles in a upwardly flowing air stream entering a bottom of said fluidized bed to impart controlled cyclic movement to the particles with a portion of the bed flowing upwardly.

22. A method according to claim 1 wherein said polymer is a copolymer containing a carboxyl functionality selected from the group consisting of salt, anhydride, free acid and alkyl ester forms.

23. A method according to claim 1 wherein said polymer is at least partially formed from monomer units selected from the group consisting of acrylic acid, methacrylic acid, styrene and mixtures thereof, and said polymer is insoluble in said carrier.

24. A method according to claim 1 wherein said polymer is selected from the group consisting of partially esterified polymers of acrylic acid, methacrylic acid and their salt derivatives.

25. A method according to claim 1 wherein said polymers are selected from the group consisting of poly(methacrylic acid/styrene), poly(acrylic acid/$C_1$-$C_{20}$ alkyl methacrylate), poly(methacrylic acid/$C_1$-$C_{20}$ alkyl acrylate), poly(acrylic acid/$C_1$-$C_{20}$ alkyl acrylate) and poly(methacrylic acid/$C_1$-$C_{20}$ alkyl methacrylate).

26. A method according to claim 1 wherein the polymer comprises vinyl acetate monomer units.

27. A method according to claim 1 wherein said polymer is poly(methacrylic acid/ethyl acrylate/butyl acrylate/methyl methacrylate).

28. A method according to claim 1 wherein said coated particle has an average diameter ranging between 500 and 2000 microns.

29. A method according to claim 1 wherein said coated particle has an average particle size ranging between 150 and 3000 microns.

30. A method according to claim 1 wherein said latex has a solids content from 40% to 50%.

* * * * *